(12) United States Patent
Ries et al.

(10) Patent No.: US 11,234,799 B2
(45) Date of Patent: Feb. 1, 2022

(54) METHOD AND A TOOL FOR MANUFACTURING A DENTAL IMPLANT AND A DENTAL IMPLANT APPARATUS MANUFACTURED HEREBY

(71) Applicant: CERA M GMBH, Wertheim (DE)

(72) Inventors: Stefan Ries, Wertheim (DE); Walter Lutz, Wertheim (DE)

(73) Assignee: CERA M GMBH, Wertheim (DE)

( * ) Notice: Subject to any disclaimer, the term of this patent is extended or adjusted under 35 U.S.C. 154(b) by 484 days.

(21) Appl. No.: 15/776,208

(22) PCT Filed: Oct. 26, 2016

(86) PCT No.: PCT/EP2016/001781
§ 371 (c)(1),
(2) Date: May 15, 2018

(87) PCT Pub. No.: WO2017/084735
PCT Pub. Date: May 26, 2017

(65) Prior Publication Data
US 2020/0253700 A1    Aug. 13, 2020

(30) Foreign Application Priority Data

Nov. 19, 2015  (DE) .......................... 102015015080.4
Dec. 15, 2015  (DE) .......................... 102015016254.3

(51) Int. Cl.
*A61C 13/00*    (2006.01)
*A61C 8/00*    (2006.01)

(52) U.S. Cl.
CPC .......... *A61C 13/0006* (2013.01); *A61C 8/006* (2013.01); *A61C 8/0012* (2013.01); *A61C 8/0069* (2013.01); *A61C 8/0068* (2013.01)

(58) Field of Classification Search
CPC ... A61C 13/0006; A61C 13/0022; A61C 3/06; A61C 8/00; A61C 8/0012–0078; A61C 8/0089
(Continued)

(56) References Cited

U.S. PATENT DOCUMENTS 5,282,747 A * 2/1994 Nordin ................... A61C 13/30
433/220
9,277,974 B2   3/2016 Lutz et al.
(Continued)

FOREIGN PATENT DOCUMENTS

DE           20319341 U1    4/2005
DE       102009057754 A1    6/2011
(Continued)

OTHER PUBLICATIONS

Machine Translation of DE102014203459 A1. Accessed at EPO website, Sep. 22, 2020 (Year: 2020).*
(Continued)

*Primary Examiner* — Edward Moran
(74) *Attorney, Agent, or Firm* — McCoy Russell LLP

(57) ABSTRACT

A method for manufacturing a dental implant apparatus that comprises an implant and an implant support that can be placed next to one another by contact surfaces and that have contours providing security against rotation that are integrally molded on in one piece. The implant and an implant support have mutually matching contours that prevent a rotation of the implant and the implant support when placed next to one another. A tool system for carrying out the described methods and a dental implant apparatus that is manufactured in a corresponding manner are further disclosed. A contact surface of the implant is ground using a first grinding gauge that has a grinding surface having the shape of the contact surface of the implant attachment but (Continued)

not having the shape of the contour providing security against rotation of the implant. The contact surface of the implant support is ground using a second grinding gauge that has a grinding surface having the shape of the contact surface of the implant but not having the shape of the contour providing security against rotation of the implant support.

8 Claims, 3 Drawing Sheets

(58) Field of Classification Search
 USPC .................................................. 264/16–20
 See application file for complete search history.

(56) References Cited

U.S. PATENT DOCUMENTS

| | | |
|---|---|---|
| 2004/0259056 A1 | 12/2004 | Holt |
| 2012/0028215 A1* | 2/2012 | Wade .................. A61C 1/10 433/75 |
| 2015/0147724 A1* | 5/2015 | Staudenmann ...... A61C 8/0068 433/201.1 |
| 2015/0351878 A1* | 12/2015 | Honig .................. A61C 8/0089 433/201.1 |
| 2017/0231729 A1* | 8/2017 | Burger ............... A61C 13/0006 407/42 |

FOREIGN PATENT DOCUMENTS

| | | |
|---|---|---|
| DE | 102010018245 A1 | 10/2011 |
| DE | 102014203459 A1 * | 10/2015 |

OTHER PUBLICATIONS

ISA European Patent Office, International Search Report Issued in Application No. PCT/EP2016/001781, dated Jan. 25, 2017, WIPO, 4 pages.

* cited by examiner

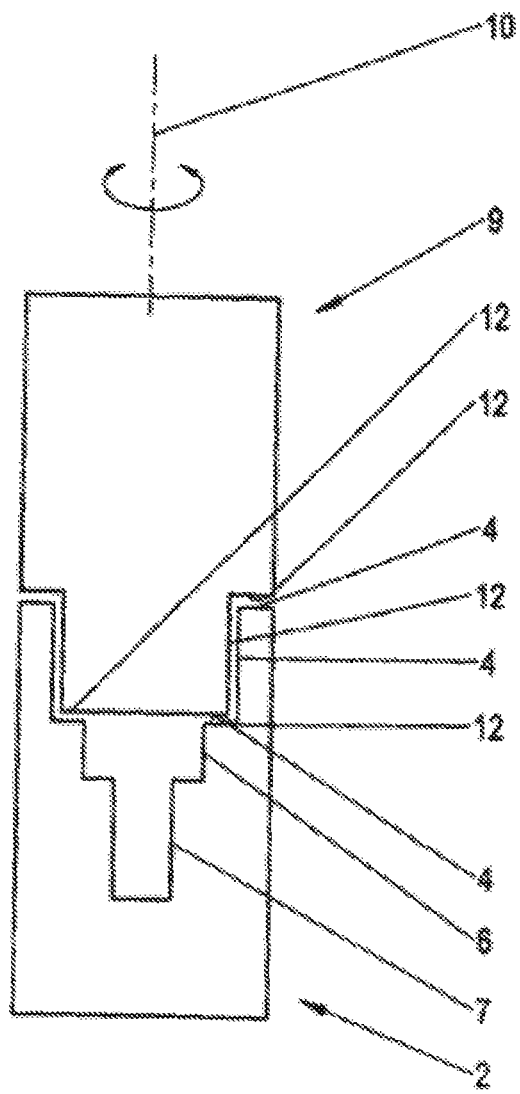
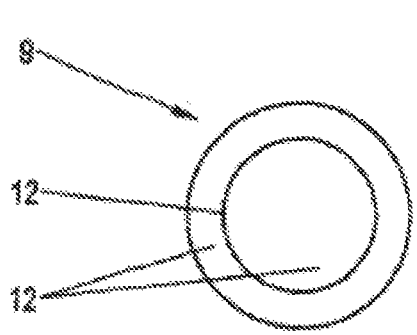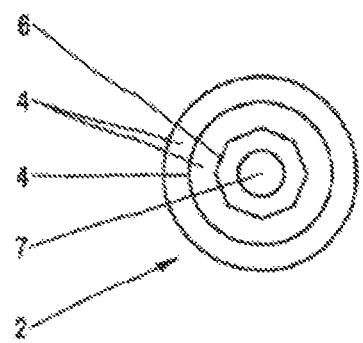
Fig. 1A
Fig. 1B  Fig. 1C

METHOD AND A TOOL FOR MANUFACTURING A DENTAL IMPLANT AND A DENTAL IMPLANT APPARATUS MANUFACTURED HEREBY

CROSS-REFERENCE TO RELATED APPLICATIONS

The present application is a U.S. National Phase of International Patent Application Serial No. PCT/EP2016/001781, entitled "METHOD AND TOOL FOR PRODUCING A DENTAL IMPLANT DEVICE AND A DENTAL IMPLANT DEVICE PRODUCED IN THIS WAY," filed on Oct. 4, 2016. International Patent Application Serial No. PCT/EP2016/001781 claims priority to German Patent Application No. 102015015080.4, filed on Nov. 19, 2015, and German Patent Application No. 102015016254.3, filed on Dec. 15, 2015. The entire contents of each of the abovementioned applications are hereby incorporated by reference in their entirety for all purposes.

TECHNICAL FIELD

The present invention relates to a method for manufacturing a dental implant apparatus that comprises an implant and an implant support that can be placed next to one another by means of contact surfaces and that have mutually matching contours providing security against rotation that are integrally molded on in one piece and that prevent a rotation of the implant and the implant support in the state placed next to one another. The invention further relates to a tool system for carrying out such a method and furthermore to a dental implant apparatus that is manufactured in a corresponding manner.

BACKGROUND AND SUMMARY

Two-part or multiple part implant systems that can comprise the actual implant and an implant support that can be placed next to it, in particular the so-called implant abutment, are as a rule produced from brittle materials such as ceramics or zirconium oxide or materials having similar physical properties so that the parts of the implant system have to be exactly matched to one another at their joining points to achieve a high stability and to avoid overloads at points that can result in damage such as brittle failure or surface chips.

A dental implant system is, for example, known from DE 10 2009 057 754 A1 whose implant and implant support are ground against one another at their touching or contact surfaces. Such a mutual grinding while making use of a grinding paste can eliminate surface irregularities caused in production so that a more uniform attachment of the contact surfaces to one another can be achieved. Stress peaks can hereby be minimized and the break stability of the implant system parts connected to one another can be increased.

In order to be able to realize an unambiguous position capability of the two components with this known implant system, the two components, i.e. the implant and the implant support, are secured against rotation with respect to one another by a protection against rotation. Since this protection against rotation would prevent the mutual grinding of the contact surfaces of the implant and of the implant support, the protection against rotation is only attached as an additional component subsequently, i.e. after the workstep of the grinding. Such a subsequently added protection against rotation brings along various other disadvantages, however. Such a protection against rotation is very small due to the type of construction. The protection against rotation must nevertheless have a high mechanical stability due to high mechanical loads through the chewing forces. In addition, there is the fact that the handling, in particular in the mouth, becomes difficult due to the small size.

To this extent, implant apparatus whose implant and implant support have securities against rotation molded on in one piece clearly have the advantage. Implant systems are known from the prior art in which the implant components to be joined to one another have contours providing security against rotation that engage into one another, for example in the form of a projecting hexagonal stub and of a hexagonal cut-out corresponding thereto that engage into one another on the placement of the implant components onto one another and hereby secure them against rotation. Such internally connecting connections can also have different non-rotationally symmetrical contour geometries and are substantially characterized in that a non-rotationally symmetrical positive contour enters into a negative mold corresponding thereto at the other component. On the other hand, externally connecting connections are also known in which an outer-side contour providing security against rotation or the positive mold of the implant head meets a negative mold matched in shape hereto at the implant support.

With such implant apparatus whose implant and implant support have contours providing security against rotation already molded on, a mutual grinding of the contact surfaces is, however, not possible since the contours providing security against rotation and engaging into one another prevent it. On the placing together of the implant and the implant support so that the contact surfaces contact one another and could be ground against one another, the contours providing security against rotation simultaneously come into engagement with one another so that every grinding movement of the implant relative to the implant support is prevented.

Starting from this, it is the underlying object of the present invention to provide an improved method for manufacturing a dental implant apparatus, a tool for such a method, and an improved dental implant apparatus that avoid the disadvantages of the prior art and further develop the latter in an advantageous manner. A uniform, harmonious force transmission and surface pressure without stress peaks should in particular be achieved at the contact surfaces of the implant and of the implant support that are seated on one another and a security against rotation should be simultaneously provided without having to acquire it at the cost of a laborious attachment of a separate security against rotation.

It is therefore proposed to grind the contact surface of the implant and the contact surface of the implant support corresponding thereto, but in so doing to leave open a contour providing security against rotation that is already provided at the implant and a contour providing security against rotation at the implant support corresponding thereto. The contact surfaces can hereby be exactly matched to one another in shape while the contours providing security against rotation can also function sufficiently without such an exact shape matching since here, for example, excessive spot loads can be avoided by a more generous size coordination that avoids press fits, without impairing the function of providing security against rotation.

In accordance with the invention, the contact surface of the implant is ground using a first grinding gauge that has a grinding surface having the shape of the contact surface of the implant attachment and that leaves open the contour providing security against rotation of the implant, while the contact surface of the implant support is ground using a second grinding gauge that has a grinding surface having the shape of the contact surface of the implant and that leaves open the contour providing security against rotation of the implant support.

The implant can therefore in particular be ground using a grinding gauge that corresponds in the shape of its grinding surface to the contact surface of the implant support, but does not have its contour providing security against rotation so that the grinding movement between the grinding gauge and the implant is not blocked. Conversely, the implant support can be ground using a grinding gauge whose grinding surface substantially corresponds to the contact surface of the implant, but does not have the contour providing security against rotation of the implant so that a grinding movement between the grinding gauge and the implant support is not blocked.

The grinding gauge can in particular be configured and/or contoured such that the grinding tool only contacts the contact surface of the implant or the contact surface of the implant support, but not the rotation-inhibiting contours of the component to be ground. The grinding gauge is left open by a sufficient amount in the region of the rotation-inhibiting contours so that the grinding gauge can be moved in a grinding manner with respect to the implant or with respect to the implant support even if the grinding surface of the grinding gauge is in fixed contact, in particular over the total area, with the contact surface of the implant or with the contact surface of the implant support.

The grinding gauges for grinding the implant or for grinding the implant support are advantageously each only used once. Shape deviations that arise due to wear of the grinding gauge can be avoided by using a respective new grinding gauge for grinding every implant and every implant support. The respective grinding tool experiences a certain wear at the grinding surface, that can result in shape tolerances, on the grinding of a component. Shape changes in the amount of the tool abrasion or of the wear of the grinding gauge can thus not be transmitted to the workpiece, i.e. to the implant or to the implant support, if a new grinding gauge is used every time.

If, however, each grinding gauge is only used once, a very high precision can be ensured in the region of the contact surfaces over a large volume of implant components since the abrasion always remains constant both at the implant component and at the grinding tool.

The grinding gauges can optionally, however, also be used multiple times, in particular when the grinding tool has not experienced too great an abrasion and wear during one or more preceding grinding processes. A good compromise between a high precision of the contact surfaces and an economic use of the grinding gauges can be achieved with, for example, a threefold to fivefold use of the grinding gauges. A decision can be made individually on how often a grinding gauge is used and when a new grinding gauge is taken up in dependence on the wear of the grinding gauges that occurs.

In an advantageous further development of the invention, grinding gauges of a material are used here that corresponds to the material of the implant to be ground or to the material of the implant support to be ground. It can be advantageous here if the grinding gauge and the component to be ground are composed of the same material, that is the implant is ground using a grinding gauge of the material of the implant and, conversely, the implant support is ground using a grinding gauge of the material of the implant support. However to simulate the actual surface pressure conditions as identically as possible during grinding, it can also be advantageous to ground the implant using a grinding gauge of the material of the implant support and/or, conversely, to grind the implant support using a grinding gauge of the material of the implant. If the implant and the implant support consist of the same material, this naturally does not play any role; but it can be advantageous, however, if the implant and the implant support have different material compositions.

The grinding can generally be implemented using different grinding movements, with the grinding movement being able to be adapted to the shape of the respective contact surface to be ground.

In accordance with an advantageous further development of the invention, the contact surfaces of the implant components can be ground in a rotational manner, with the grinding tool or the grinding gauge advantageously being able to be rotated about the axis of the security against rotation relative to the component, that is the relative movement between the grinding gauge and the implant or implant support takes place about a grinding axis of rotation that substantially corresponds coaxially—perhaps with slight angular deviations or an offset—to the axis with respect to which the contours providing security against rotation that engage into one another would prevent the rotation. If, for example, a hexagonal stub and a hexagonal cut-out are provided as the security against rotation, the grinding axis of rotation can correspond to the central longitudinal axis of the hexagonal stub or to the central longitudinal axis of the hexagonal cut-out.

Depending on the contact surface to be ground, a different grinding movement can, however, also be used alternatively or additionally to such a rotational grinding movement. If, for example, cylindrical contact surfaces are ground, an axial grinding movement can be superposed, in a similar manner to honing, on a rotational grinding movement, that is, the grinding tool can be rotated and moved to and fro along the axis of rotation. In general, other grinding movements, for example a guiding of the grinding tool along a circle, and an additionally superposed rotational movement about itself and other grinding movements are also possible.

The contact surfaces of the implant and of the associated implant support to be ground can generally be of different shapes and dimensions. To enable a rotational grinding movement, the contact surfaces could advantageously be formed as rotationally symmetrical, in particular rotationally symmetrical with respect to the axis of the security against rotation of the contour providing security against rotation. Conical contact surfaces and/or planar contact surfaces and/or cylindrical contact surfaces can, for example, in particular be provided, but also more complicated contact surfaces, for example in the form of egg-shaped or ellipsoid-like contact surfaces.

An axis of symmetry of the respective contact surface can advantageously extend coaxially to the axis of the security against rotation of the contour providing security against rotation. If, for example, the implant or the implant support comprises a conical contact surface, for example in the form of a conical cut-out, and a contour providing security against rotation, for example in the form of a hexagonal recess, the longitudinal cone axis can be arranged as coaxial with the axis of the hexagonal recess.

The invention will be explained in more detail in the following with reference to an advantageous embodiment and to associated drawings. There are shown in the drawing:

BRIEF DESCRIPTION OF THE FIGURES

FIG. 1 shows a schematic representation of the grinding of an implant with a first grinding gauge that leaves out the contours providing security against rotation and only grinds the contact surface of the implant, with the part view (A) showing in a total view the grinding gauge placed on the implant and the implant; the part view (B) showing a front-side plan view of the grinding gauge and its grinding surface; and the part view (C) showing front-side plan view of the implant that shows the cylindrical or conical contact surface and the lower set contour providing security against rotation and the screw reception bore;

DETAILED DESCRIPTION

Figure 3:
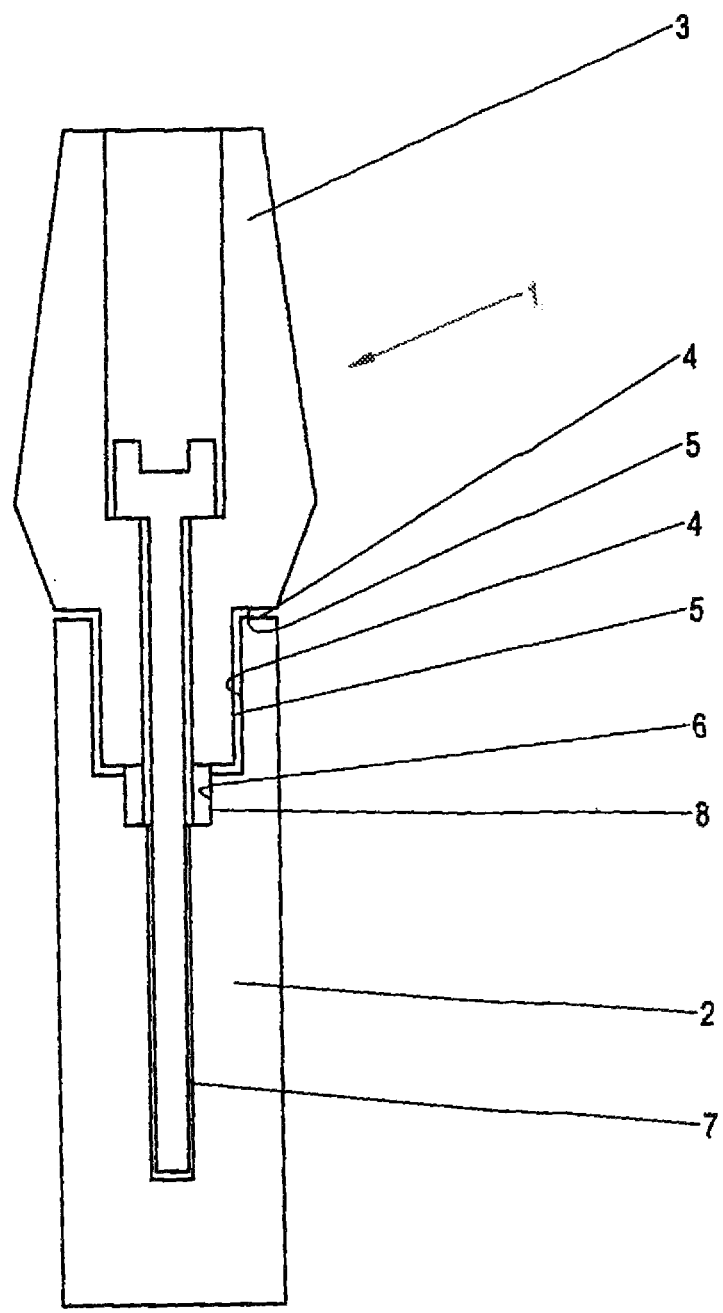
FIG. 3 shows a schematic representation of the ground implant and of the ground implant support in the state set against one another.

As FIG. 3 shows, the implant apparatus 1 can comprise an implant 2 that can be connected with an exact fit to an implant support 3. The implant 2 can, for example, be configured in the form of an implant screw or also in another form to be implanted in a jaw for a dental prosthesis, wherein an implant body, that is approximately cylindrical, for example, is shown in the drawing. The implant support 3 can likewise correspond to a tooth in a manner known per se or can also only correspond to a tooth carrier on which then a further body is placed, with a likewise approximately cylindrical support structure being shown in the drawings.

Figure 2A:
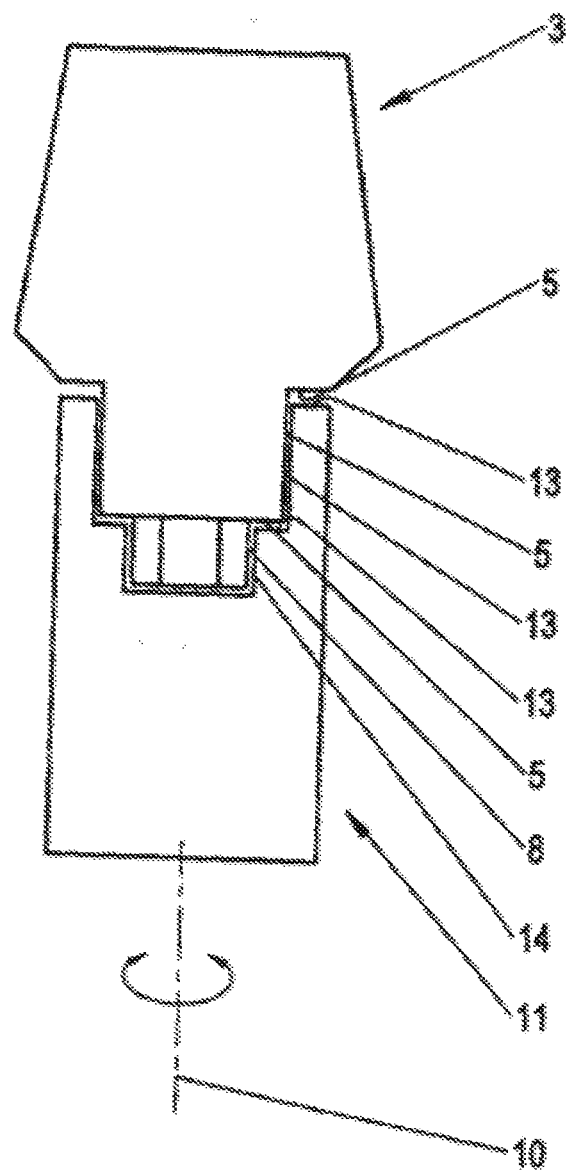
FIG. 2 shows a schematic representation of the grinding of the implant support, with the part view (A) showing in a total view the grinding gauge set at the implant support; the part view (B) showing a front-side plan view of the implant support and its contour providing security against rotation; and the part view (C) showing a front-side plan view of the grinding gauge.
Figure 2B:
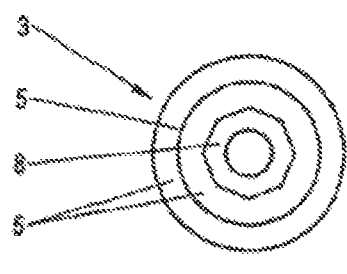
Figure 2C:
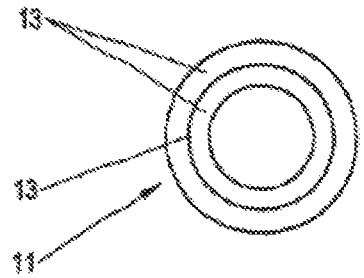

As FIG. 3 shows, and also in comparison with FIGS. 1 and 2, the implant 2 and the implant support 3 each have a contact surface 4 and 5 respectively that are matched to one another in shape and that can be configured as complementary to one another. The contact surface 4 of the implant 2 can, for example, have a cylindrical and/or conical inner jacket surface and/or a planar annular surface that can extend substantially transversely to the longitudinal axis of the implant, with a plurality of such planar annular surfaces also being able to be provided, for example being able to adjoin the conical or cylindrical jacket surface like a collar at the top and bottom.

The implant support 3 can have a contact surface 5 in a corresponding manner that can, for example, be formed as a cylindrical or conical frustrated cone, can therefore in particular have a cylindrical or conical outer jacket surface section and/or can substantially comprise planar annular surface sections.

In general, the contact surfaces can, however, also be conversely formed; for example, the implant can have a cylindrical or conical contact surface stump and the implant support can have a cylindrical or conical contact surface cut-out. Alternatively or additionally, the contact surfaces can also be contoured in a different manner.

The contact surfaces can in particular be configured and matched to one another such that they transmit axial forces, i.e. forces acting in the direction of the chewing force and/or transverse forces and/or prevent a tilting of the implant parts with respect to one another.

In addition to the contact surface 4, the implant 2 comprises a contour providing security against rotation 6 that can, for example, be configured as an inner closing surface and can be arranged coaxially to the contact surface 4. For example, an inner hexagonal cut-out can be provided as a contour providing security against rotation 6 that adjoins the cylindrical or conical contact surface 4 or is arranged lower in the inside of the implant 2. The implant 2 can furthermore have a screw cut-out 7 in which a screw can be fixed that can fix the implant support 3 to the implant 2.

As FIGS. 2A, B, and C show, the implant support 3 an have a contour providing security against rotation 6 that corresponds to the contour providing security against rotation 8 of the implant 2 and that can be in the form of a hexagonal stump that can engage into the inner hexagon of the implant 2 and can hereby secure the implant support 3 against rotation with respect to the implant 2. It is, however, understood that other contours providing security against rotation 6 and 8 can also be provided that differ from a circular shape or from a circular cylinder shape, for example in the form of an octagonal contour section or of a contour section formed in a different manner. The contours providing security against rotation 6 and 8 can in particular be configured to prevent a rotation about an axis of rotation 10 that extends centrally in parallel with the direction of the chewing force and surrounds the implant parts.

As FIGS. 1A, B, and C show, a grinding gauge 9 comprising a grinding surface 12 is used for the grinding of the contact surface 4 of the implant 2 and the grinding gauge can comprise the same material as the implant 2 or the same material of the implant support 3 and its shape substantially corresponds to the implant support 3, but does not have its contour providing security against rotation 8, that is, the grinding gauge 9 admittedly comprises the cylindrical or conical contact surface stump of the implant support 3, but not its hexagonal stump that forms the contour providing security against rotation 8.

To grind the implant 2, the grinding gauge 9 and the implant 2 are pressed axially against one another and/or are rotated relative to one another, and indeed abut the axis of the security against rotation 10 of the contour providing security against rotation 6 that can correspond to a main axis or to a longitudinal axis or to a center axis of the implant 2.

As FIGS. 2A, B, and C show, a grinding gauge 11 is used for the grinding of the implant support 3 and its grinding surface 13 substantially corresponds to the contact surface 4 of the implant 2, with the grinding gauge 11, however, not having the contour providing security against rotation 6 of the implant 2, but rather leaves open the contour providing security against rotation of the implant support 3. For this purpose, the grinding tool 11 can have a sufficiently large recess 14 in which the hexagonal stump-shaped contour providing security against rotation 6 of the implant support 3 can be contactlessly lowered.

For the grinding, the implant support 3 is pressed axially against the grinding tool 11 and/or is rotated relative hereto, and indeed about the axis of the security against rotation 10 of the contour providing security against rotation 8 of the implant support 3 that can correspond to a main axis or a longitudinal axis or a central center axis of the implant support.

The invention claimed is:

1. A dental implant and grinding tool system, comprising:
   an implant with a contact surface extending into one end of the implant and a rotation prevention contour extending into the implant from an interior end of the contact surface, the implant having a cylindrical or conical contact surface cut-out on which the respective contact surface is formed, and the implant having an inner rotation prevention cut-out on which the respective rotation prevention contour is formed, the rotation prevention cut-out adjoining the contact surface cut-out;

an implant support with a contact surface extending from one end of the implant support and a rotation prevention contour extending from an end of the contact surface distal from the implant support, the implant support having a cylindrical or conical contact surface stump on which the respective contact surface is formed, and the implant support having a rotation prevention stump on which the respective rotation prevention contour is formed, the rotation prevention stump extending from the contact surface stump, and the contact surface of the implant support shaped to fit within the contact surface of the implant, wherein the rotation prevention contour of the implant support fits within the rotation prevention contour of the implant, and the rotation prevention contours having mutually matching contours that are molded integrally and that prevent a rotation of the implant and of the implant support with respect to one another;

a first grinding gauge and a second grinding gauge for grinding the implant and implant support, wherein the contact surface of the implant is ground using the first grinding gauge and the contact surface of the implant support is ground using the second grinding gauge;

the first grinding gauge having a grinding stump on which a grinding surface is formed, the grinding surface having a shape matching the contact surface cut-out of the implant but not having the shape of the rotation prevention contour of the implant, and the grinding surface extending into the implant, and the grinding stump being received by the contact surface cut-out of the implant; and the second grinding gauge having a grinding surface having a cavity shaped to receive the contact surface stump of the implant support, the grinding surface having a shape matching the contact surface stump, and a second cavity which receives the rotation prevention stump of the implant support but does not grind the rotation prevention contour of the implant support.

2. The system in accordance with claim 1, wherein the grinding is carried out by rotating the first grinding gauge relative to the implant about a grinding axis of rotation that extends coaxially to the axis of the rotation prevention contour of the implant and/or is carried out rotationally by rotating the second grinding gauge relative to the implant support about a grinding axis of rotation that substantially extends coaxially to the axis of the rotation prevention contour of the implant support.

3. The system in accordance with claim 1, wherein the grinding is carried out using a grinding paste between the first grinding gauge and the implant and/or between the second grinding gauge and the implant support.

4. The system in accordance with claim 1, wherein a grinding gauge material of the first grinding gauge is based on the material of the implant support and/or to the material of the implant.

5. The system of claim 1, wherein a grinding gauge material of the second grinding gauge is based on the material of the implant or to the material of the implant support.

6. A method for manufacturing a dental implant apparatus:

forming a dental implant such that the completed dental implant comprises:

an implant with a contact surface extending into one end of the implant and a rotation prevention contour extending into the implant from an interior end of the contact surface, the implant having a cylindrical or conical contact surface cut-out on which the respective contact surface is formed, and the implant having an inner rotation prevention cut-out on which the respective rotation prevention contour is formed, the rotation prevention cut-out adjoining the contact surface cut-out, and an implant support with a contact surface extending from one end of the implant support and a rotation prevention contour extending from an end of the contact surface distal from the implant support, the implant support having a cylindrical or conical contact surface stump on which the respective contact surface is formed, and the implant support having a rotation prevention stump on which the respective rotation prevention contour is formed, the rotation prevention stump extending from the contact surface stump, the contact surface stump of the implant support shaped to fit within the contact surface cut-out of the implant, and the rotation prevention cut-out and stump of the implant and implant support having mutually matching rotation prevention contours molded in one piece and having the shapes that prevent a rotation of the implant and of the implant support with respect to one another when placed in contact with one another, grinding the contact surface of the implant support using a first grinding gauge having a grinding surface having a first cavity which receives the contact surface stump, the grinding surface matching a shape corresponding to the contact surface stump of the implant support and a second cavity which receives the rotation prevention stump of the implant support but does not grind the rotation prevention contour;

grinding the contact surface of the implant using a second grinding gauge having a grinding stump on which a grinding surface is formed, the grinding surface extending into the implant and the grinding surface having a shape matching the contact surface cut-out of the implant but the second grinding gauge not extending into the rotation prevention contour of the implant, and the grinding stump being received by the contact surface cut-out of the implant.

7. The method in accordance with claim 6, wherein the grinding gauges are each only used for one grinding process and/or a new grinding gauge is used for each implant and for each implant support.

8. The method in accordance with claim 6, wherein one or more of the respective conical or cylindrical contact surface cut-out and stump are ground using the first and second grinding gauges.

* * * * *